C. A. MAHLE.

Machine for Boring Brush-Blocks.

No. 8,647. Reissued April 1, 1879.

Witnesses:

J. W. Garner

H. S. D. Haines

Inventor:

C. A. Mahle per F. A. Lehmann

Atty.

N. PETERS, PHOTO-LITHOGRAPHER, WASHINGTON, D. C.

UNITED STATES PATENT OFFICE.

CLEMENCE A. MAHLE, OF CORRY, PENNSYLVANIA.

IMPROVEMENT IN MACHINES FOR BORING BRUSH-BLOCKS.

Specification forming part of Letters Patent No. 210,866, dated December 17, 1878; Reissue No. 8,647, dated April 1, 1879; application filed February 7, 1879.

*To all whom it may concern:*

Be it known that I, CLEMENCE A. MAHLE, of Corry, in the county of Erie and State of Pennsylvania, have invented certain new and useful Improvements in Brush-Block-Boring Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
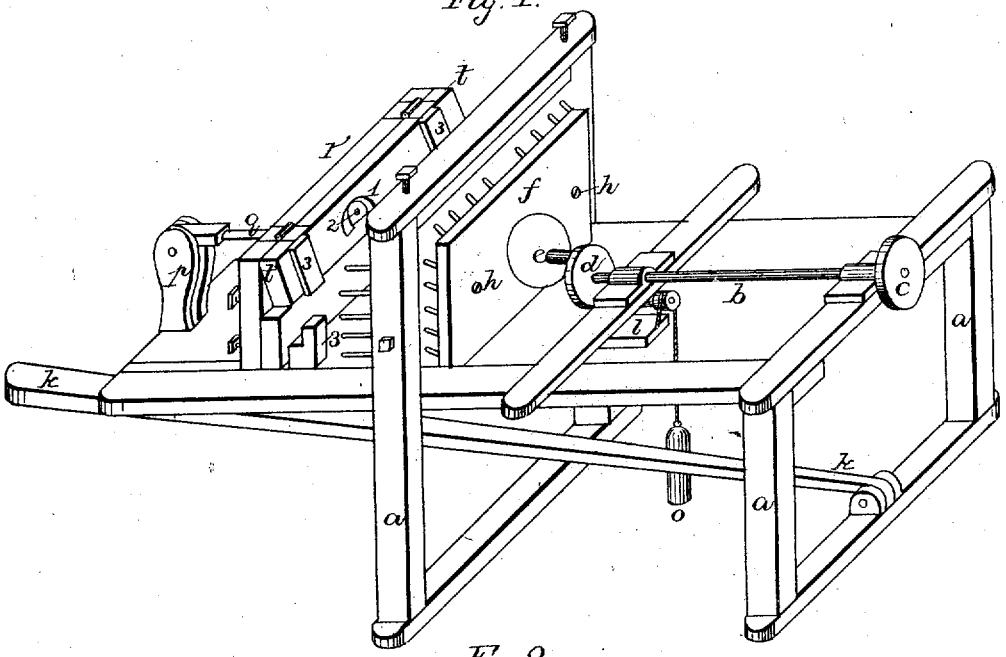
Figure 2:
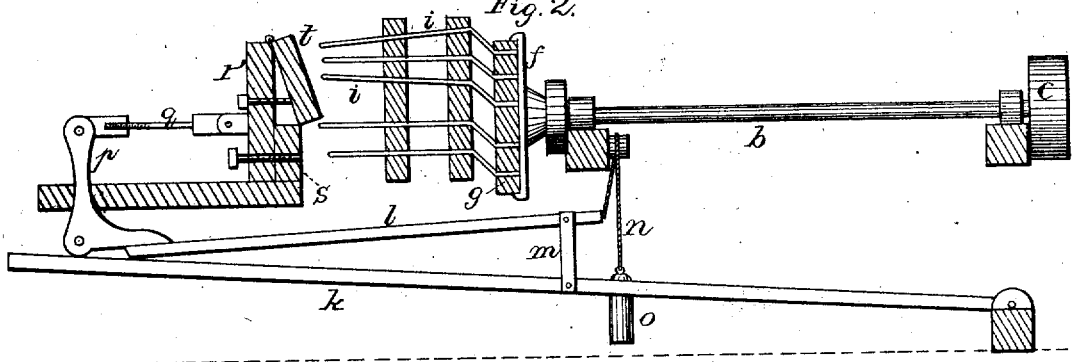
Figure 5:
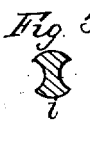
Figure 4:
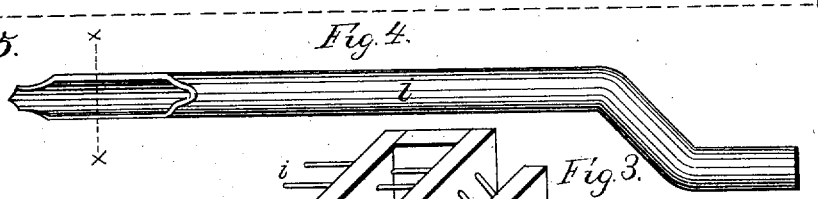
Figure 3:
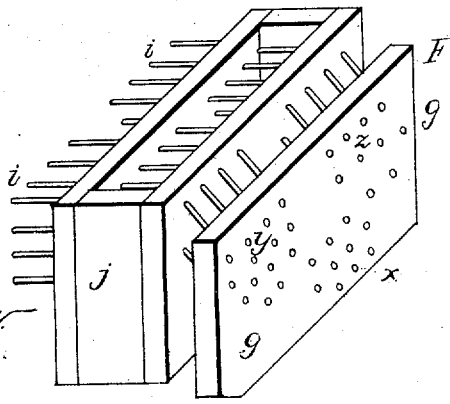

Figure 1 is a perspective view of my machine. Fig. 2 is a longitudinal section of the same. Fig. 3 is a view of the form used in my machine, and illustrates somewhat in detail the plan for arranging the bits at various angles, also the manner of grouping the holes to match a desired pattern. Fig. 4 shows the form of the boring-tools, which have a double-pod bit at one end and a crank at the other. Fig. 5 is a cross-section of the bit, taken through the line *x x*, Fig. 4.

The object of my invention is to furnish an improved machine designed expressly for boring brush-blocks, and such a one as will complete the required number of holes at their proper angles in the various patterns now in use with from one to three operations.

My invention consists in, first, driving the carrier-plate by means of a single crank instead of two, as heretofore, whereby the machine can be run at fully double the usual speed, the construction of the machine is simplified and cheapened, and the trouble of adjusting the two crank-wheels to the carrier-plate done away with; second, in an adjustable table, with its attachments, for holding the blocks, and set-screws for changing its movable parts, whereby angles not otherwise anticipated may be produced; third, in a sliding frame and its accompaniments, in combination with the adjustable table, pulley, weight, and treadle, which, together, form the feeding apparatus, whose action is regulated by the will of the operator and not by the driving mechanism. These several parts are hereinafter more fully described.

*a* represents a suitable frame, upon the top of which is journaled the shaft *b*, which has the driving-pulley *c* on one end and the crank-wheel *d* on the other. This crank-wheel *d* is connected by a suitable boss, *e*, with the carrier-plate *f*, so as to not only support the plate in position, but to operate it.

Heretofore the carrier-plate has always been driven by a crank at each end, thus necessitating a gear-wheel on the end of the shaft and a gear-wheel carrying a crank on each side of this central wheel. Where these three wheels are used, a very fine adjustment of the two cranks is necessary in attaching them to the carrier-plate, so as to prevent an undue strain or wear of parts when the machine is in motion. Should the adjustment of the two cranks to the plate not be accurate, or one of the cranks wear more than the other, the motion of the plate will be uneven, and both the carrier-plate and the cranks will be worn and injured.

By the use of a single crank the three gear-wheels are done away with, the cost of the machine is cheapened, and the friction lessened to such an extent that the carrier-plate can be driven at double the speed that it can where two cranks are used.

In boring a number of holes, as here shown, speed is of the utmost importance; and as the carrier-plate can be driven with one crank eight hundred revolutions a minute where it can only be driven four hundred with two cranks, it will be readily seen that the working capacity of the machine is doubled, while much better work is done.

The carrier-plate has flanges formed around its edges on the inner side, and inside of these flanges is placed the form *g*, which is held in position by the set-screws *h*. The driving-tools *i* pass through and are supported in the box-like frame *j*, while their cranked ends pass into and are held by the form *g*.

When the carrier-plate is operated by the driving-crank a rapid rotary motion is given to the boring-tools. Extra weight is added to one side of the crank-wheel for the purpose of governing the reciprocating movements of the carrier-plate, and which imparts a rapid motion to the boring-tools. These boring-tools consist of long steel rods having a crank on one end and a bit on the other. In the construction of the bits the flutings are first ground on opposite sides of the rod, and meet at the end, forming an angle of about ten degrees. A slightly conical taper is then made on the side at right angles with the flutings, so as to leave a concave shoulder. An abrupt drill-point having an angle of ninety to one hundred degrees is then formed at the extreme point of the bit.

The treadle *k*, hinged at one end to the frame, is connected to the lever *l* by a rod, *m*. To the inner end of this lever is fastened the cord *n*, which passes up over a pulley and has a weight, *o*, fastened to its other end. To the outer end of this lever *l* is secured the cranked lever *p*, to the upper end of which is fastened the adjustable table by means of a connecting-rod, *q*, which rod has a screw formed at its outer end, so as to regulate the distance the table shall move toward the boring-tools, and thus gage the depth of the holes. This table moves back and forth on the sliding frame in suitable grooves, and consists of the board or frame *r*, base-board *s*, and folding board *t*, attached to the upper edge of the frame *r* by hinges. Near the middle of the folding board *t* there is fastened a curved spring, 1, to the block 2. To the folding and base boards are fastened cleats 3, which, in connection with the spring, hold the blocks in proper position to be operated upon by the bits.

In order to change the position of the folding and base boards and facilitate the adjustment of angles not provided for in the form *g* and frame *j*, set-screws are passed through the frame *r*, and bear against the folding and base boards, whereby they may be adjusted at will.

The form *g* has three patterns or groups of tools arranged in it, each one of which groups bore separately parts of the brush-block.

In operating the machine, a block is first placed in the clasps prepared for it on the base-board *s;* then, by pressing downward on the outer end of the treadle, the table is moved toward the driving-tools, and the middle portion of the block is bored, giving a reduced copy of whatever is indicated in the group at *x*, Fig. 3. As the treadle springs upward, moved by the weight, the table moves backward, and the block is taken out and placed at right angles with its former position in the place prepared for it on the folding board *t*. The treadle is again depressed, so as to force the table upon the boring-tools, and another group of holes is added, reduced from form *y*, Fig. 3. The ends of the block are then reversed, the block is set in the space prepared for it at the other end of the folding board, and a reduced copy of form *z* is produced. While form *y* is being produced a new block on the base-board is receiving form *x*, and while *z* is produced form *x* is adding form *y*. Thus, at every move of the treadle, each of the three blocks is subjected to one of these changes.

I use an unlimited number of forms in my machine, but the frame-work of each is essentially the same as that shown in Fig. 3, and operates on similar principles. The groupings must, however, necessarily differ, to correspond with different patterns.

For the board *g* and frame *j*, I use soft wood, generally bass-wood, and discard the use of metallic face-plates, for they increase the friction as well as the expense.

Having thus described my invention, I claim—

1. In a brush-block-boring machine, the combination of the driving-shaft *b*, journaled upon the center of the supporting-frame *a*, opposite the driving-plate, and having a crank upon its inner end, with the driving-plate *f* and the drill-rods, the crank being applied to the driving-plate at or near its center, whereby the plate may be driven by a single crank, substantially as shown.

2. The combination of the bearings *j*, carrier-plate *g*, and drill-rods *i*, the said drill-rods being arranged in groups, and the rods of each group placed at a different angle, whereby the different-angled holes of each block are successively bored by the same machine, substantially as shown.

3. The combination of the treadle *k*, lever *l*, connected thereto and having a weight connected to its rear end, cranked lever, and moving block-board, substantially as described.

4. The movable block-board having the fixed part *s* and the hinged adjustable part *t*, substantially as set forth.

In testimony that I claim the foregoing I have hereunto set my hand this 24th day of January, 1879.

CLEMENCE A. MAHLE.

Witnesses:

L. E. GUIGNON,

E. E. GUIGNON.